Figure 1:
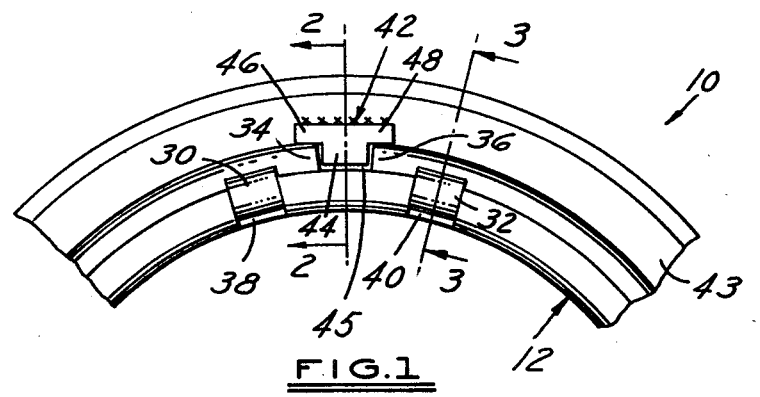

United States Patent [19]

Strader

[11] 4,144,922

[45] Mar. 20, 1979

[54] WHEEL RIM ASSEMBLY FOR TUBELESS PNEUMATIC TIRES

[75] Inventor: Don S. Strader, Marietta, Ga.

[73] Assignee: Motor Wheel Corporation, Lansing, Mich.

[21] Appl. No.: 867,808

[22] Filed: Jan. 9, 1978

[51] Int. Cl.² .............................................. B60C 5/16
[52] U.S. Cl. ............................ 152/410; 152/DIG. 10; 152/DIG. 17
[58] Field of Search ............ 301/11 CD, 35 R, 35 SS, 301/35 SL; 152/406, 408, 409, 410, 396, DIG. 10, DIG. 17; 285/13, 14, DIG. 25; 403/288

[56] References Cited

U.S. PATENT DOCUMENTS

| | | | |
|---|---|---|---|
| 2,991,820 | 7/1961 | Bourdon | 152/410 |
| 3,106,237 | 10/1963 | Holmes | 152/410 |
| 3,995,676 | 12/1976 | Casey | 152/410 |

Primary Examiner—Robert J. Spar
Assistant Examiner—H. Grant Skaggs
Attorney, Agent, or Firm—Barnes, Kisselle, Raisch & Choate

[57] ABSTRACT

A wheel rim assembly comprising a generally cylindrical rim base and a flange ring including a bead seat retained at one axial end of the rim base by a split locking ring. A T-shaped lug on the flange ring captures the ends of the locking ring in a corresponding groove on the rim base and prevents removal of the locking and flange rings when a tire mounted on the wheel rim is inflated. Circumferential grooves on the inside surface of the tire bead seat cooperate with an annular seal in the rim base to prevent inflation of a tire mounted on the wheel rim when the flange ring and bead seat are improperly positioned thereon.

9 Claims, 5 Drawing Figures

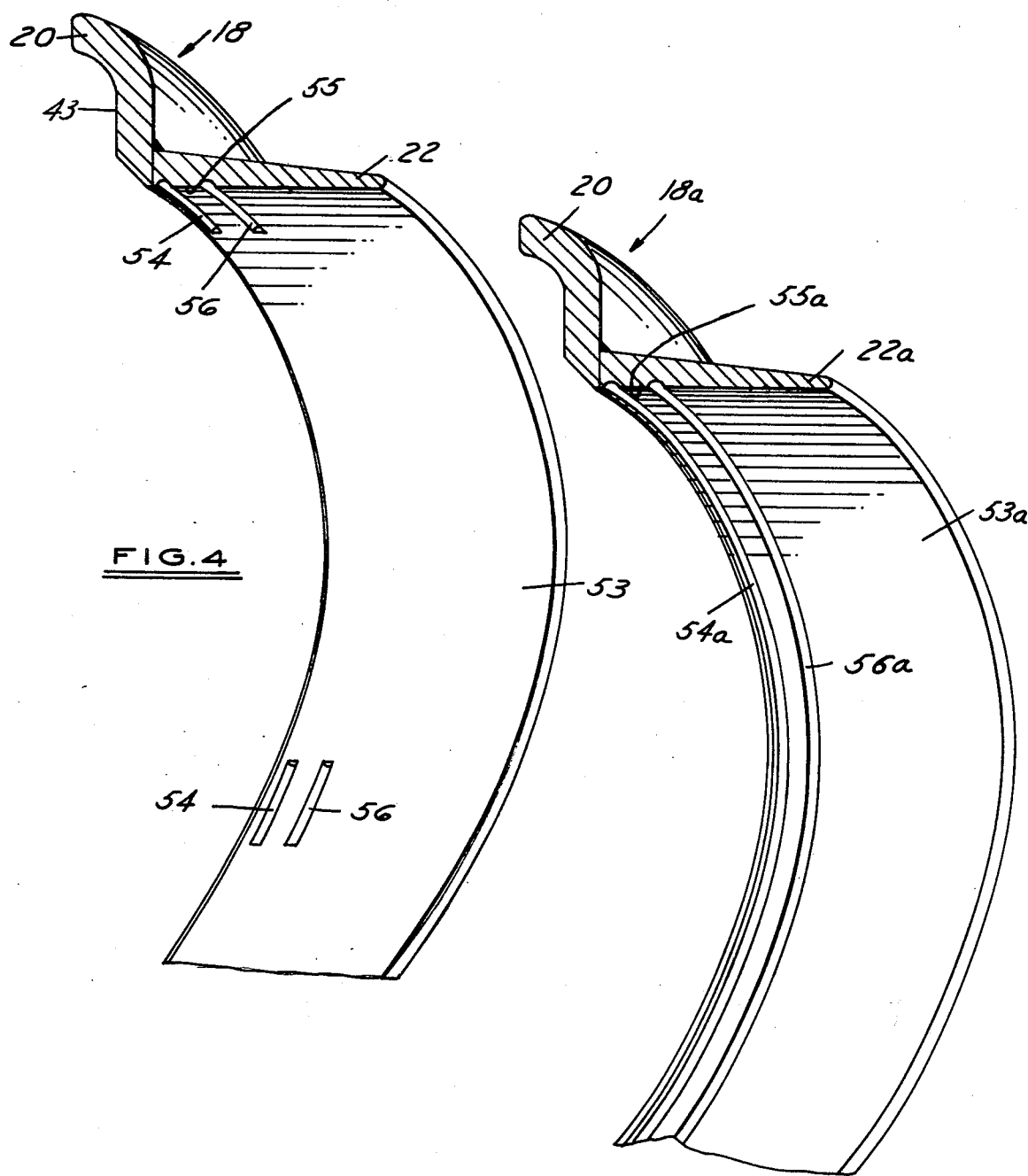

WHEEL RIM ASSEMBLY FOR TUBELESS PNEUMATIC TIRES

The present invention is directed to wheel rim assemblies for tubeless pneumatic tires, and more particularly to wheel rim assemblies of the type having a removable flange ring for mounting or demounting of a tubeless pneumatic tire thereon.

It has heretofore been recognized in the art that wheel rim assemblies of the above-described type, which are often adapted for use with high-pressure truck tires or the like, may present a significant safety hazard if it is attempted to inflate a tire mounted thereon when the various rim assembly components are improperly positioned or seated, or to disassemble the rim when the tire mounted thereon is inflated. Prior art wheel rim assemblies of the subject type are shown, for example, in the U.S. Pats. of Scott, No. 880,332; Hegar, No. 1,403,777; Woodward, No. 2,105,829; Verdier, No. 3,459,252; Sons et al, No. 3,882,919; and Casey, No. 3,995,676.

Objects of the present invention are to provide a wheel rim assembly for tubeless pneumatic tires or the like which vents a tire mounted thereon to atmosphere and thereby prevents inflation of the tire when the rim assembly components are improperly positioned, and/or which prevents disassembly of the rim components when a tire mounted thereon is inflated.

Figure 2:
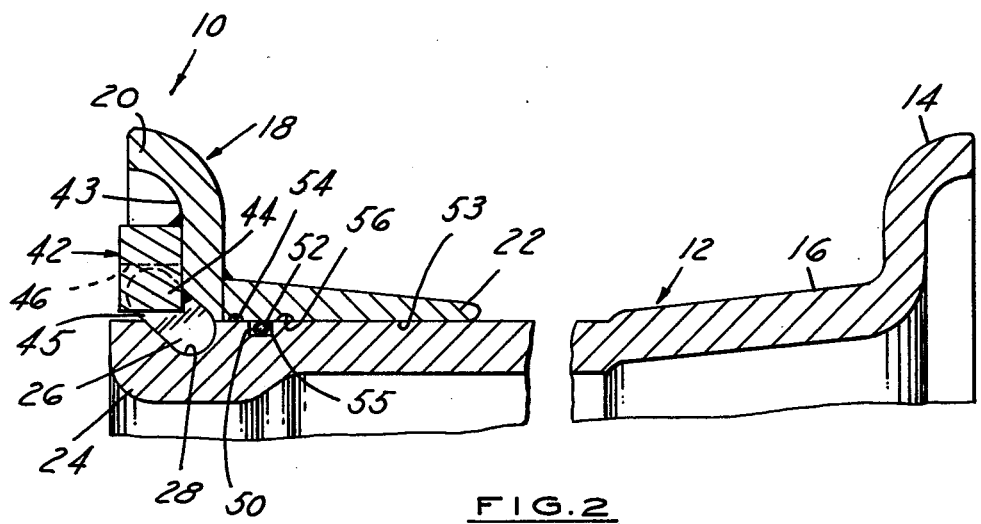
Figure 3:
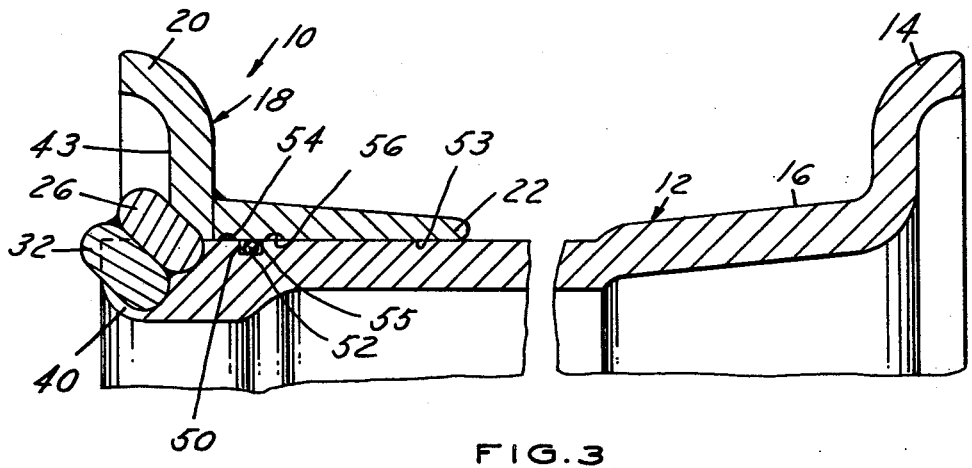

The present invention, together with additional objects, features advantages thereof, will be best understood from the following description, the appended claims and the accompanying drawings in which:

FIG. 1 is a partial elevational view of a presently preferred embodiment of a wheel rim assembly in accordance with the invention;

FIGS. 2 and 3 are sectional views taken along the respective lines 2—2 and 3—3 in FIG. 1;

FIG. 4 is a partially sectioned perspective view of a presently preferred embodiment of the combined flange ring and bead seat assembly in accordance with the invention; and FIG. 5 is a view similar to that of FIG. 4 of an alternative embodiment of the invention.

Referring to FIGS. 1-4, a wheel rim assembly 10 in accordance with the invention comprises a generally cylindrical rim base 12 having an integral radially outwardly extending and axially outwardly flaring rim flange 14 at one axial end thereof adjacent a raised integral tire bead seat 16. A flange ring assembly 18, comprising a circumferentially continuous flange ring 20 and an axially inwardly extending bead seat 22 affixed thereto, is axially removably carried at the edge 24 of rim base 12 remote from flange 14. A split annular locking ring 26 is removably disposed in a circumferentially continuous groove 28 in the outer surface of rim base 12 axially externally of flange ring 18 rim base adjacent end 24 and projects radially therefrom at a preferred angle of forty-five degrees with respect to the rim base axis to prevent axial removal of flange ring assembly 18 from the rim base. A pair of lugs 30, 32 adjacent the ends 34, 36 of locking ring 26 (FIG. 1) project radially inwardly into the corresponding slots 38, 40 formed in rim base 12 circumferentially to couple locking ring 26 to the rim base.

In accordance with a first important aspect of the present invention, a T-shaped lug 42 (FIGS. 1 and 2) is affixed as by welding to the axially outer surface 43 of flange ring 20 and includes a radially inwardly extending leg portion 44 which projects into the ring gap 45 defined between ring ends 34, 36, as best seen in FIG. 1, circumferentially to couple flange ring 18 to locking ring 26 and thereby through lugs 30, 32 to rim base 12. The tangentially oppositely extending portions or arms 46, 48 of lug 42 radially overlie and thus capture ends 34, 36 of locking ring 26 within rim base groove 28 so that the locking ring may not be removed from the rim base groove while flange ring assembly 18 is urged axially away from flange 14 and against ring 26 by inflation pressure of a tire (not shown) mounted on the rim assembly. In this manner, lug 42 cooperates with locking ring 26 to prevent removal or disassembly of the wheel components while a tire mounted thereon is inflated.

Rim base 12 includes a circumferentially continuous groove 50 in the outer surface thereof in which an annular resilient O-ring 52 is seated. The diameter of O-ring 52 exceeds the radial depth of groove 50 so that O-ring 52 partially protrudes, in its free state condition, radially outwardly beyond the adjacent surface of rim 12. Thus O-ring 52 is disposed for air sealing engagement with a radially inner surface 53 of bead seat 22 to seal a tubeless tire mounted on wheel rim assembly 10 from leakage to atmosphere. In accordance with a second important aspect of the present invention, a pair of circumferentially extending grooves or channels 54, 56 are provided in surface 53 of bead seat 12 and are adapted to be disposed on either side of and closely adjacent to rim base groove 50 when flange ring assembly 18 is properly positioned on the rim base against locking ring 26 as shown in FIGS. 2 and 3.

Hence, when the flange ring assembly is so properly positioned, O-ring 52 is in sealing engagement with that portion 55 of the inner surface 53 of the bead seat disposed between grooves 54, 56, such grooves preferably being axially spaced from each other by a distance greater than the width of the rim base groove 50. However, if flange ring assembly 18 is not properly positioned on rim base 12, one of the grooves 54, 56 will register with rim base groove 50 such that O-ring 52 will not seal properly against opposing bead seat surface 55 and a tire mounted on rim assembly 10 will be vented to atmosphere between the bead seat and the rim base. Bypass bead seat grooves 54, 56 thereby cooperate with otherwise generally conventional rim base groove 50 and sealing ring 52 to prevent inflation of a tire mounted on the wheel rim assembly when flange ring assembly 18 is improperly positioned on the rim base.

The preferred configuration of bypass grooves 54, 56 in bead seat inner surface 53 is illustrated in FIG. 4 and comprises a circumferential array of axially spaced elongated groove pairs disposed around the inner surface of the bead seat. Three groove pairs 54, 56 spaced one hundred twenty degrees from each other have been found to yield satisfactory results, two such pairs being illustrated in FIG. 4. An alternative configuration of bead seat grooves is illustrated in FIG. 5 and comprises a circumferentially continuous axially separated groove pair 54a, 56a around the inner bead seat surface 53a of modified bead seat 22a.

Assembly and disassembly of wheel rim 10 will be self-evident from the foregoing discussion and need only be outlined herein. With flange ring 18 and locking ring 26 demounted from rim 12, and with O-ring 52 disposed in rim base groove 50, a pneumatic tubeless tire (not shown) is slid axially and sidewise onto rim base 12 and against integral flange 14. Preassembled flange ring assembly 18 is then loosely positioned over rim base 12 against the tire and pushed toward flange 14 for enough to leave groove 28 unobstructed. Locking ring 26 is next positioned in groove 28 with lugs 30, 32 disposed in notches 38, 40. Flange ring assembly 18 is then pulled axially outwardly against locking ring 26 and angularly oriented such that leg 44 of lug 42 nests in the gap between locking ring ends 34, 36 as illustrated in FIG. 1. In this position, bead grooves 54, 56 are properly disposed on either side of seal 52 such that the tire mounted on the wheel rim assembly may be inflated. To remove the tire, the tire is first deflated and the flange ring assembly 18 is pushed thereagainst to move lug 42, specifically lug arms 46, 48, out of radially capturing alignment with locking ring ends 34, 36. Locking ring 26 may then be removed from the rim base by inserting a crowbar or the like beneath lugs 30, 32 and prying the same radially outwardly to expand ring 26 free of groove 28, whereupon flange ring 18, followed by the tire, may be demounted from the rim.

Although the wheel rim assembly provided by the invention has been described herein with reference to specific embodiments thereof, many alternatives, modifications and variations will suggest themselves to persons skilled in the art. For example, integral flange 14 and bead seat 16 may be replaced by a removable flange ring assembly identical to that illustrated at 18 such that a tire mounted on the wheel rim assembly may be removed from either direction. Similarly, bypass groove arrangements other than those previously discussed may be provided. For example, grooves 56 may be deleted and only grooves 54 provided when it is anticipated that the only flange ring misalignment condition which will be encountered will be one in which the flange ring assembly is not moved axially outwardly to a sufficient extent to bring the same into abutment with locking ring 26. For added safety the paired bypass groove arrangements heretofore described are preferred. However, the invention is intended to embrace the above-noted and all other alternatives, modifications and variations as fall within the spirit and broad scope of the appended claims.

The invention claimed is:

1. In a wheel rim assembly for tubeless pneumatic tires which includes generally cylindrical rim base means, flange means carried at opposed axial ends of said rim base means, at least one of said flange means being axially removable from said rim base means, means for retaining said at least one flange means on said rim base means, circumferential first groove means in an outer surface of said rim base means and annular sealing means disposed in said circumferential first groove means and adapted to cooperate with an inner surface of said at least one flange means to seal a tire mounted on said wheel rim assembly from leakage to atmosphere, the improvement comprising second groove means in said inner surface of said at least one flange means adapted to register with said circumferential first groove means in said outer surface of said rim base means when said flange means is improperly positioned on said rim base means to vent a tire mounted on said wheel rim assembly to atmosphere between said at least one flange means and said rim base means, and thereby to prevent inflation of a tire mounted on said wheel rim assembly when said at least one flange means is improperly positioned on said rim base means.

2. The improved wheel rim assembly set forth in claim 1 wherein said one flange means includes a tire bead seat, said second groove means being disposed on a radially inner surface of said tire bead seat.

3. The improved wheel rim assembly set forth in claim 2 wherein said second groove means includes paired axially spaced groove means adapted to be disposed on either side of said first groove means when said one flange means is properly positioned on said rim base means, said annular sealing means being adapted for sealing engagement with said inner surface of said bead seat between said axially spaced groove means.

4. The improved wheel rim assembly set forth in claim 3 wherein said axially spaced groove means comprises a pair of circumferentially elongated grooves in said inner surface of said bead seat.

5. The improved wheel rim assembly set forth in claim 4 wherein said pair of grooves are circumferentially continuous around said bead seat.

6. The improved wheel rim assembly set forth in claim 4 wherein said axially spaced groove means comprises paired arrays of circumferentially spaced grooves extending around said bead seat.

7. The improved wheel rim assembly set forth in claim 4 wherein said retaining means comprises a circumferential groove in a radially outer surface adjacent one axial end of said rim base means, a split annular locking ring removably disposed in said groove axially externally of said at least one flange means and projecting radially outwardly of said outer surface to prevent axial removal of said one flange means from said rim base means, and lug means fixedly mounted to said flange means, said lug means having a first radially extending portion adapted to project into the gap in said split locking ring circumferentially to couple said flange means to said locking ring and rim face means, and a second portion extending tangentially in opposite directions from said first portion radially to capture ends of said locking ring forming said gap in said groove and thereby to prevent removal of said locking ring when said flange means is urged axially against said locking ring by inflation pressure in a tire mounted in said wheel rim assembly.

8. In a wheel rim assembly for pneumatic tires which includes generally cylindrical rim base means, flange means carried at opposite axial ends of said rim base means, at least one of said flange means being axially removable from said rim base means for mounting a tire on said wheel rim assembly, and means for retaining said at least one flange means on said rim base means, the improvement wherein said retaining means comprises a circumferential groove in a radially outer surface adjacent one axial end of said rim base means, a split annular locking ring removably disposed in said groove axially externally of said flange means and projecting radially outwardly of said outer surface to prevent axial removal of said flange means from said rim base means, and lug means fixedly mounted to said flange means, said lug means having a first radially extending portion adapted to project into the gap defined between the split ends of said split locking ring circumferentially to couple said flange means to said locking ring and rim base means and a second portion extending tangentially in opposite directions from said first portion radially outwardly overlapping said split ends of said locking ring to capture said locking ring in said groove and thereby prevent removal of said locking ring when said flange means is urged axially against said locking by inflation pressure in a tire mounted on said wheel rim assembly.

9. The improved wheel rim assembly set forth in claim 8 further comprising a second circumferential groove in said outer surface of said rim base means, annular resilient sealing means disposed in said groove adapted to cooperate with an inner surface of said flange means to seal a tire mounted on said wheel rim assembly from leakage to atmosphere, a pair of axially spaced third groove means in said inner surface of said flange means adapted to be disposed on either side of said second groove when said flange means is properly positioned on said rim base means, said third groove means being adapted to register with said second groove when said flange ring means is improperly positioned on said rim base means to thereby vent a tire mounted on said wheel rim assembly to atmosphere.

* * * * *

UNITED STATES PATENT AND TRADEMARK OFFICE
CERTIFICATE OF CORRECTION

PATENT NO. : 4,144,922

DATED : March 20, 1979

INVENTOR(S) : Don S. Strader

It is certified that error appears in the above-identified patent and that said Letters Patent are hereby corrected as shown below:

Column 5, line 1, after "locking" insert -- ring --

Signed and Sealed this

Eighteenth Day of September 1979

[SEAL]

Attest:

LUTRELLE F. PARKER

Attesting Officer    Acting Commissioner of Patents and Trademarks